(12) United States Patent
Lim et al.

(10) Patent No.: US 7,379,858 B2
(45) Date of Patent: May 27, 2008

(54) COMPUTATION OF ALL-PAIRS REACHING PROBABILITIES IN SOFTWARE SYSTEMS

(75) Inventors: Chu-Cheow Lim, Santa Clara, CA (US); Zhao Hui Du, Shanghai (CN); Tin-Fook Ngai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 730 days.

(21) Appl. No.: 10/778,545

(22) Filed: Feb. 17, 2004

(65) Prior Publication Data

US 2005/0182602 A1 Aug. 18, 2005

(51) Int. Cl.
*G06F 13/22* (2006.01)

(52) U.S. Cl. ............... 703/22; 718/102; 717/158; 717/156; 717/155; 717/141; 717/129; 703/6

(58) Field of Classification Search ............ 703/6, 703/22; 718/102; 717/155, 141, 158, 129, 717/156, 151; 707/1; 713/200; 714/47; 326/46; 700/48
See application file for complete search history.

(56) References Cited

U.S. PATENT DOCUMENTS

| | | | |
|---|---|---|---|
| 6,112,317 A * | 8/2000 | Berc et al. | 714/47 |
| 6,260,190 B1 * | 7/2001 | Ju | 717/156 |
| 6,332,214 B1 * | 12/2001 | Wu | 717/141 |
| 6,412,105 B1 * | 6/2002 | Maslennikov et al. | 717/151 |
| 6,782,511 B1 * | 8/2004 | Frank et al. | 716/1 |
| 7,155,708 B2 * | 12/2006 | Hammes et al. | 717/155 |
| 2001/0052120 A1 * | 12/2001 | Babaian et al. | 717/9 |
| 2003/0079206 A1 * | 4/2003 | Bates et al. | 717/129 |
| 2004/0059443 A1 * | 3/2004 | Sharangpani | 700/48 |
| 2004/0154010 A1 * | 8/2004 | Marcuello et al. | 717/158 |
| 2004/0154011 A1 * | 8/2004 | Wang et al. | 717/158 |
| 2004/0154019 A1 * | 8/2004 | Aamodt et al. | 718/102 |
| 2004/0215593 A1 * | 10/2004 | Sharangpani et al. | 707/1 |
| 2005/0012521 A1 * | 1/2005 | Sharangpani et al. | 326/46 |
| 2005/0055565 A1 * | 3/2005 | Fournet et al. | 713/200 |

OTHER PUBLICATIONS

Huang et al., "Speculative disambiguation: a compilation technique for dynamic memory disambiguation", IEEE 1994.*
Fernandez et al., "Speculative alias analysis for executable code", IEEE 2002.*

* cited by examiner

*Primary Examiner*—Paul L Rodriguez
*Assistant Examiner*—Kandasamy Thangavelu
(74) *Attorney, Agent, or Firm*—Venable LLP; James R. Burdett

(57) ABSTRACT

A Markov chain model of a software system may be used to compute all-pairs reaching probabilities to provide guidance in performing speculative operations with respect to the software system.

13 Claims, 6 Drawing Sheets

COMPUTATION OF ALL-PAIRS REACHING PROBABILITIES IN SOFTWARE SYSTEMS

BACKGROUND OF THE INVENTION

Speculative computing methods may provide greater computing efficiency. In such methods, sections of a sequential computing task may be carried out in parallel according to a "guess" as to how the computing task will proceed. Examples of such speculative computing methods include speculative parallel thread compilation and speculative parallel thread program execution.

One aspect of performing speculative computing is the prediction of when a particular path will be taken in a computing task. For example, a program may contain several different points at which it may proceed to different steps, depending, for example, on data input, a computed value, etc. In speculative computing, the predictions of which paths will actually be taken during a computing task determine the efficiency of the technique. The more spurious the predictions are, the less efficient the technique becomes.

DEFINITIONS

Components/terminology used herein for one or more embodiments of the invention is described below:

In some embodiments, "computer" may refer to any apparatus that is capable of accepting a structured input, processing the structured input according to prescribed rules, and producing results of the processing as output. Examples of a computer may include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer may have a single processor or multiple processors, which may operate in parallel and/or not in parallel. A computer may also refer to two or more computers connected together via a network for transmitting or receiving information between the computers. An example of such a computer may include a distributed computer system for processing information via computers linked by a network.

In some embodiments, a "machine-accessible medium" may refer to any storage device used for storing data accessible by a computer. Examples of a machine-accessible medium may include: a magnetic hard disk; a floppy disk; an optical disk, like a CD-ROM or a DVD; a magnetic tape; a memory chip; and a carrier wave used to carry machine-accessible electronic data, such as those used in transmitting and receiving e-mail or in accessing a network.

In some embodiments, "software" may refer to prescribed rules to operate a computer. Examples of software may include: code segments; instructions; computer programs; and programmed logic.

In some embodiments, a "computer system" may refer to a system having a computer, where the computer may comprise a computer-readable medium embodying software to operate the computer.

BRIEF DESCRIPTION OF THE DRAWINGS

Various embodiments of the invention will now be described in connection with the associated drawings, in which.

DETAILED DESCRIPTION OF VARIOUS EMBODIMENTS

Figure 1:
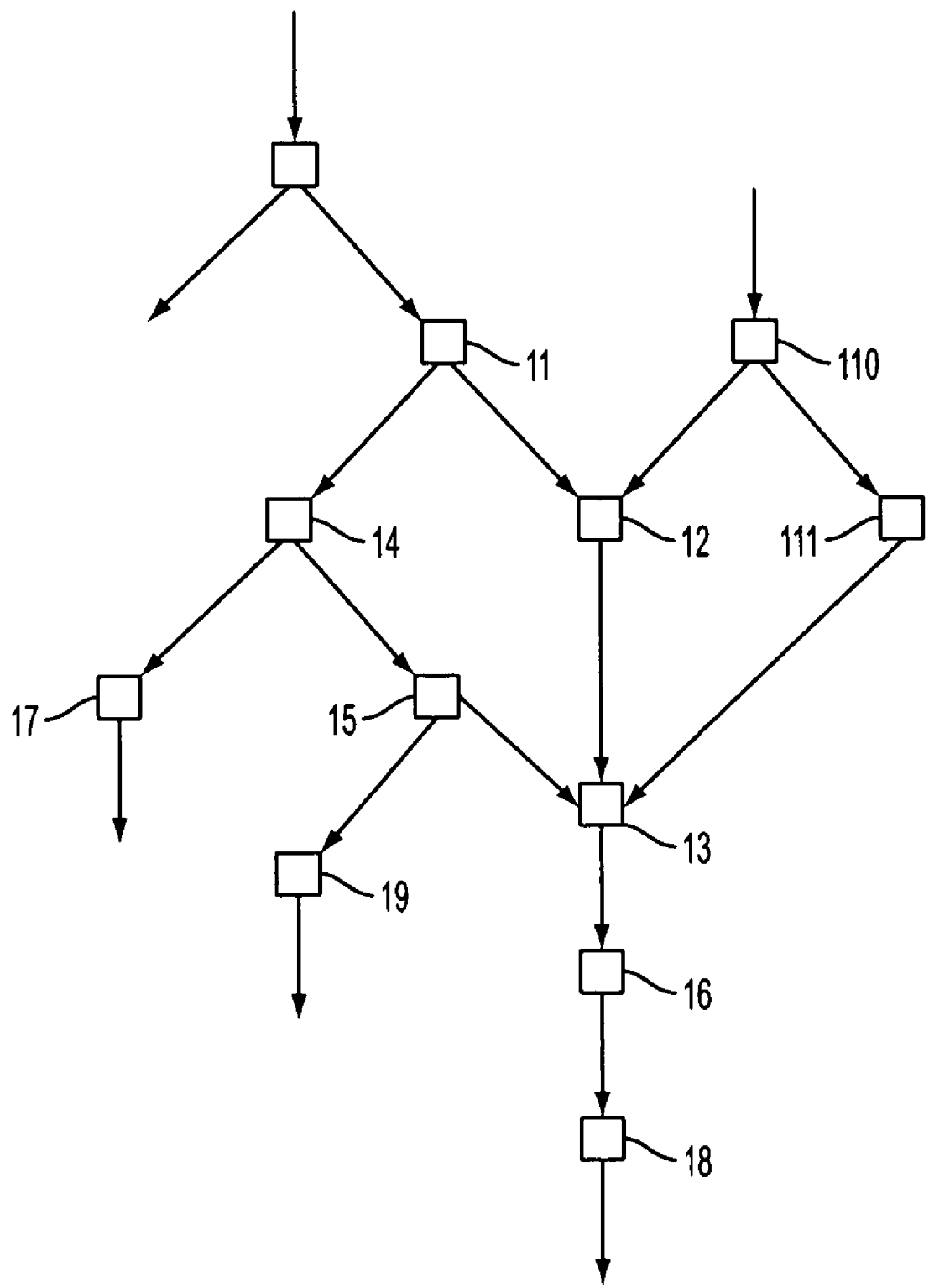
FIG. 1 depicts a conceptual block diagram of a software system to which may be applied a method according to an embodiment of the invention.

Many software systems may be represented using control flow graphs (CFG). A CFG is a directed graph connecting various software blocks. FIG. 1 shows a conceptual block diagram of a CFG of a portion of an exemplary software system. Such an exemplary software system may include, but is not limited to, software code for compilation, software code for execution, etc. Each node of the CFG, e.g., 11, 12, 13, may represent a software system component, including, but not limited to, an instruction, an address, an operation, a block (e.g., of software code), etc. The nodes may be connected by branches indicating possible transitions from one node to another. For example, in the case where nodes 11, 12, and 13 represent addresses containing instructions, the software system may go from 11 to 12 to 13, in that order, as indicated by the arrows on the branches connecting these nodes.

Another feature that may exist in a software system, which may also be shown using the exemplary software system of FIG. 1, is branching. For example, starting at node 11, the software system may proceed to node 12 or node 14. In this example, as a result, the system may reach node 13 by following the path 11-12-13 or the path 11-14-15-13 (or it may follow other paths, such as 11-14-17 and 11-14-15-19, and thus not reach node 13 at all).

In a speculative computing system, a node, for example, node 11, may be chosen to be a "fork point," and another node, for example, node 13, may be chosen to be a "speculation point." In general, a "fork point" is a point in a software system at which a "speculation point" may be specified for parallel threading (i.e., it may be thought of as a point at which speculative computing may be initiated from at least one other point in the system). A "speculation point" refers to a point from which parallel threading may be initiated, i.e., a point from which the speculative computing system may execute parallel operations. Consistent with the above, if node 13 is selected as a speculation point when the system reaches node 11, the system may then begin a second thread (e.g., operating along the path 13-16-18- . . . ), which may result in a time savings, if and when the system reaches node 13 (but may result in a waste of resources if the system never reaches node 13; this demonstrates an example of the "speculative" aspect of such speculative computing).

As a further illustrative example, multiple speculation points may be specified at a given fork point. For example, in addition, from node 11, in addition to (or instead of) specifying a speculation point at node 13, other speculation points could be specified, e.g., at node 17 and/or at node 19, because the system could reach these nodes from node 11.

Additionally, there may be multiple fork points that specify a particular speculation point. For example, in addition to node 11, node 110 could conceivably specify a speculation point at node 13 (because node 13 may be reached by the path 110-111-13).

A potential drawback to such parallel threading is that, if the fork point and speculation point are not judiciously chosen, effort may be wasted, for example, in operating along a path that is ultimately not to be taken. For example, in a system in which speculative parallel thread compilation may be used, the system may compile a path that is never reached (and thus need not have been compiled), or in a system in which speculative parallel thread execution may be used, the system may execute a path that is never reached (and thus need not have been executed). This may result in a waste of resources and/or time, as discussed above.

Figure 3:
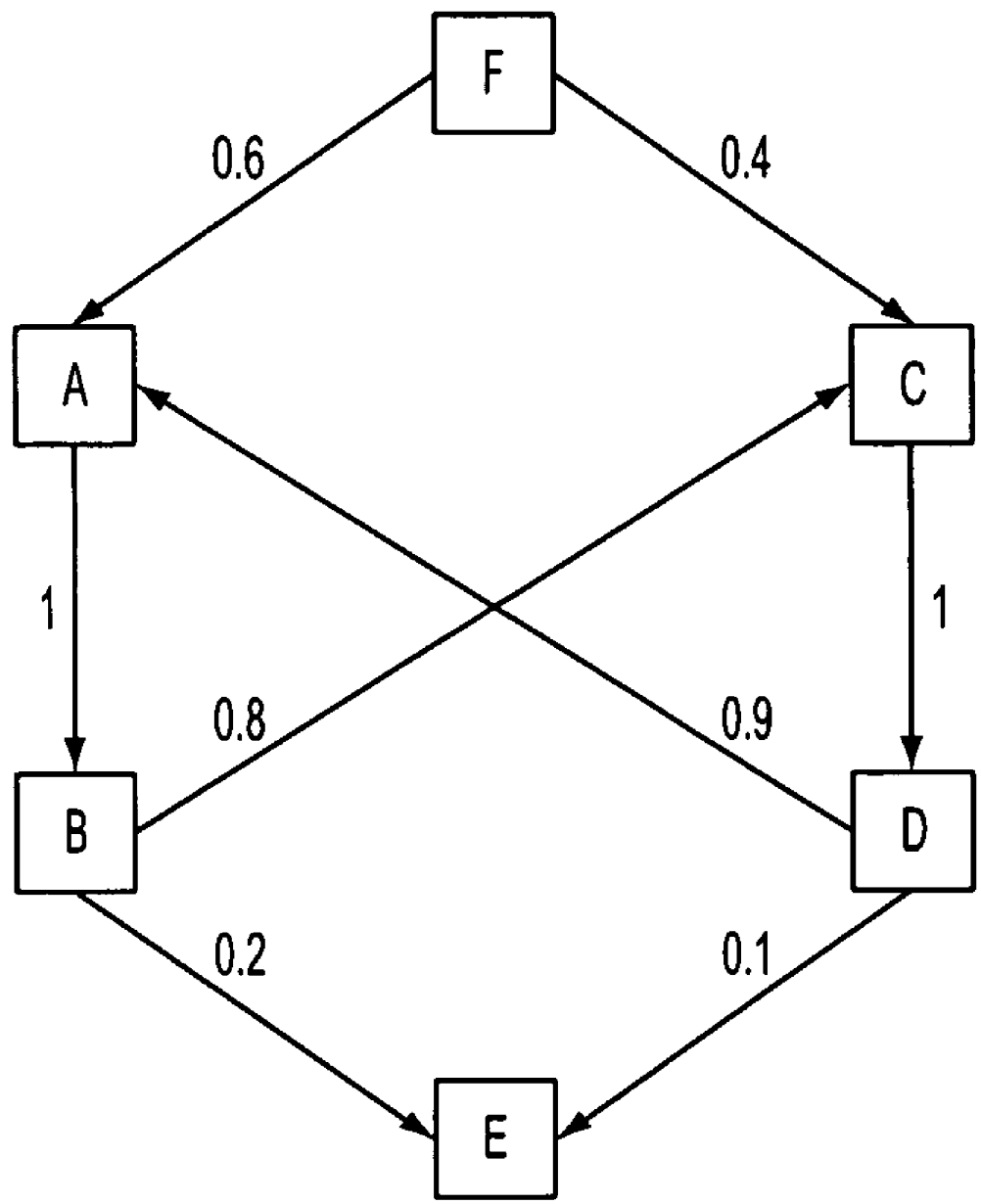
FIG. 3 depicts a specific example of a conceptual block diagram of a software system used in reference to an application of an embodiment of the invention.

In particular, the CFG representing a given software system may include branch probabilities. That is, for each branch (or arrow, as shown in FIG. 1), there may be a probability for the indicated transition between nodes. An example of such a CFG is shown in FIG. 3, which will be discussed further below. The transition probabilities may be determined by known methods, such as statistical methods and empirical methods, or by methods yet to be discovered.

In an embodiment of the invention, transitions may be assumed to be independent, and flow through the CFG, with its branch probabilities, may be modeled as a Markov chain (MC), with each node of the CFG corresponding to a state of the MC. The MC has a transition matrix, T, which may be defined by the branch probabilities of the CFG. That is, the ijth entry of T, $T_{ij}$, may be equal to the probability of a transition from the ith node to the jth node. This may correspond to block 21 of FIG. 2, which shows a flowchart of an exemplary embodiment of the invention.

In a general MC, the probability of transitioning from node i to node j in k steps may be determined as the ijth entry of the matrix $T^k$. Therefore, the probability of a transition from node i to node j in any number of steps may be determined as the ijth entry of the matrix $$R = \sum_{k=1}^{\infty} T^k = T \times (I-T)^{-1},$$

where I is an identity matrix of the same dimensionality as T. R may be determined in this manner in block 22 of the exemplary embodiment of FIG. 2.

R, as discussed above, gives a set of transition probabilities between any two nodes in the CFG. However, R does not account for the possibilities that the destination node may have been reached, passed, reached again, etc. However, for purposes of determining a good speculation point, what is needed are the probabilities that nodes will be reached, in a non-redundant fashion (i.e., for nodes A and B, the probability that, starting from node A, node B will be reached exactly once (that is, a first time)); these probabilities may be termed the "reaching probabilities" of the nodes (and one may wish to obtain a matrix containing all such reaching probabilities, the matrix of "all-pairs" reaching probabilities). In view of this, if the CFG contains any strongly connected components (i.e., as is usual in the art, a strongly connected component is a portion of a directed graph such that if there is a path from a first node to a second node, there is also a path from the second node to the first node, for all pairs of nodes in that portion of the graph), the ijth entry of R may not give the desired result because it may over-estimate the reaching probabilities of nodes within such strongly connected components. To address this situation, the process may continue with block 210 and may determine if the CFG contains any strongly-connected components. If there are none, the process may be done (i.e., R gives the desired all-pairs reaching probabilities); otherwise, the process may continue with block 23.

In block 23, an augmented matrix T' may be formed by adding a row and a column of zeros following the last row and column, respectively, of T. The added row and column may be considered as representing an added "exit state," to and from which, initially, the probability of a transition is zero.

In block 24, to which the process may proceed following block 23, the process may determine if all nodes of the CFG have been considered. If yes, then the process may be complete. If not, then a next node may be considered in block 25. If the next node is not a part of a strongly connected component of the CFG, as may be determined in block 26, the process may loop back to block 24. If, on the other hand, the next node, which will, for the purposes of this discussion, be denoted the mth node, is part of a strongly connected component, the process may progress to block 27.

In block 27, the process may form a modified augmented matrix to address the mth node. In particular, in order to prevent paths from continuing after the mth node has been reached, T' may be modified to form $T_m$ such that the probability of transitioning to the "exit state" from the mth node is one. That is, once the mth node is reached, the path may be considered complete. $T_m$ may be expressed as follows:

$$T_m[X, Y] = \begin{cases} T'[X, Y], & X \neq \text{the } m\text{th node;} \\ 0, & X = \text{the } m\text{th node, } Y \neq \text{exit state;} \\ 1, & X = \text{the } m\text{th node, } Y = \text{exit state.} \end{cases}$$

This may be applied to all nodes X and Y in the CFG.

The process may then proceed to block 28. In block 28, a matrix may be determined that may be similar to R, but using T' and $T_m$ instead of T. This matrix, $T' \times (I-T_m)^{-1}$, my then multiplied by the mth unit column vector, $U_m = (0, \ldots, 0, 1, 0, \ldots, 0)^T$, where the "1" is in the mth position, and the "T" superscript represents the transpose operator (i.e., to represent that this is a column vector, rather than a row vector). Here, note that I again represents an identity matrix, this time having the same dimensionality as $T_m$ (and T'). The resulting vector, $V_m$, may be expressed as $$V_m = T' \times (I-T_m)^{-1} \times U_m.$$

Finally, in block 29, the vector $V_m$ may be modified by eliminating its last entry. Recalling the discussion above, the last entry corresponds to the added "exit state" and thus may not represent a useful result. The remaining, shortened column vector may then contain the vector of transition probabilities from all states to the mth state and may be used to replace the mth column of matrix R. The process may then loop back to block 24.

FIG. 3 will now be used to illustrate the operation of the process described above. First, transition matrix T may be determined to be:

$$T = \begin{bmatrix} 0 & 1 & 0 & 0 & 0 & 0 \\ 0 & 0 & 0.8 & 0 & 0.2 & 0 \\ 0 & 0 & 0 & 1 & 0 & 0 \\ 0.9 & 0 & 0 & 0 & 0.1 & 0 \\ 0 & 0 & 0 & 0 & 0 & 0 \\ 0.6 & 0 & 0.4 & 0 & 0 & 0 \end{bmatrix}.$$

In this matrix, the columns and rows are arranged from A to F, as noted in FIG. 3.

Using T, the matrix R may be determined to be $$R = \begin{bmatrix} 2.57 & 3.57 & 2.86 & 2.86 & 1 & 0 \\ 2.57 & 2.57 & 2.86 & 2.86 & 1 & 0 \\ 3.21 & 3.21 & 2.57 & 3.57 & 1 & 0 \\ 3.21 & 3.21 & 2.57 & 2.57 & 1 & 0 \\ 0 & 0 & 0 & 0 & 0 & 0 \\ 3.43 & 3.43 & 3.14 & 3.14 & 1 & 0 \end{bmatrix}.$$

In FIG. 3, it may be observed that the nodes A, B, C, and D form a strongly connected component. Hence, one may follow blocks 23-29 of the flowchart of FIG. 2 to obtain substitute column vectors corresponding to these four nodes. To illustrate this for node A, first, augmented matrix T' may be formed, where T' may be given by $$T' = \begin{bmatrix} 0 & 1 & 0 & 0 & 0 & 0 & 0 \\ 0 & 0 & 0.8 & 0 & 0.2 & 0 & 0 \\ 0 & 0 & 0 & 1 & 0 & 0 & 0 \\ 0.9 & 0 & 0 & 0 & 0.1 & 0 & 0 \\ 0 & 0 & 0 & 0 & 0 & 0 & 0 \\ 0.6 & 0 & 0.4 & 0 & 0 & 0 & 0 \\ 0 & 0 & 0 & 0 & 0 & 0 & 0 \end{bmatrix}.$$

Based on T', $T_A$ may be formed as follows:

$$T_A = \begin{bmatrix} 0 & 0 & 0 & 0 & 0 & 0 & 1 \\ 0 & 0 & 0.8 & 0 & 0.2 & 0 & 0 \\ 0 & 0 & 0 & 1 & 0 & 0 & 0 \\ 0.9 & 0 & 0 & 0 & 0.1 & 0 & 0 \\ 0 & 0 & 0 & 0 & 0 & 0 & 0 \\ 0.6 & 0 & 0.4 & 0 & 0 & 0 & 0 \\ 0 & 0 & 0 & 0 & 0 & 0 & 0 \end{bmatrix}.$$

Figure 2:
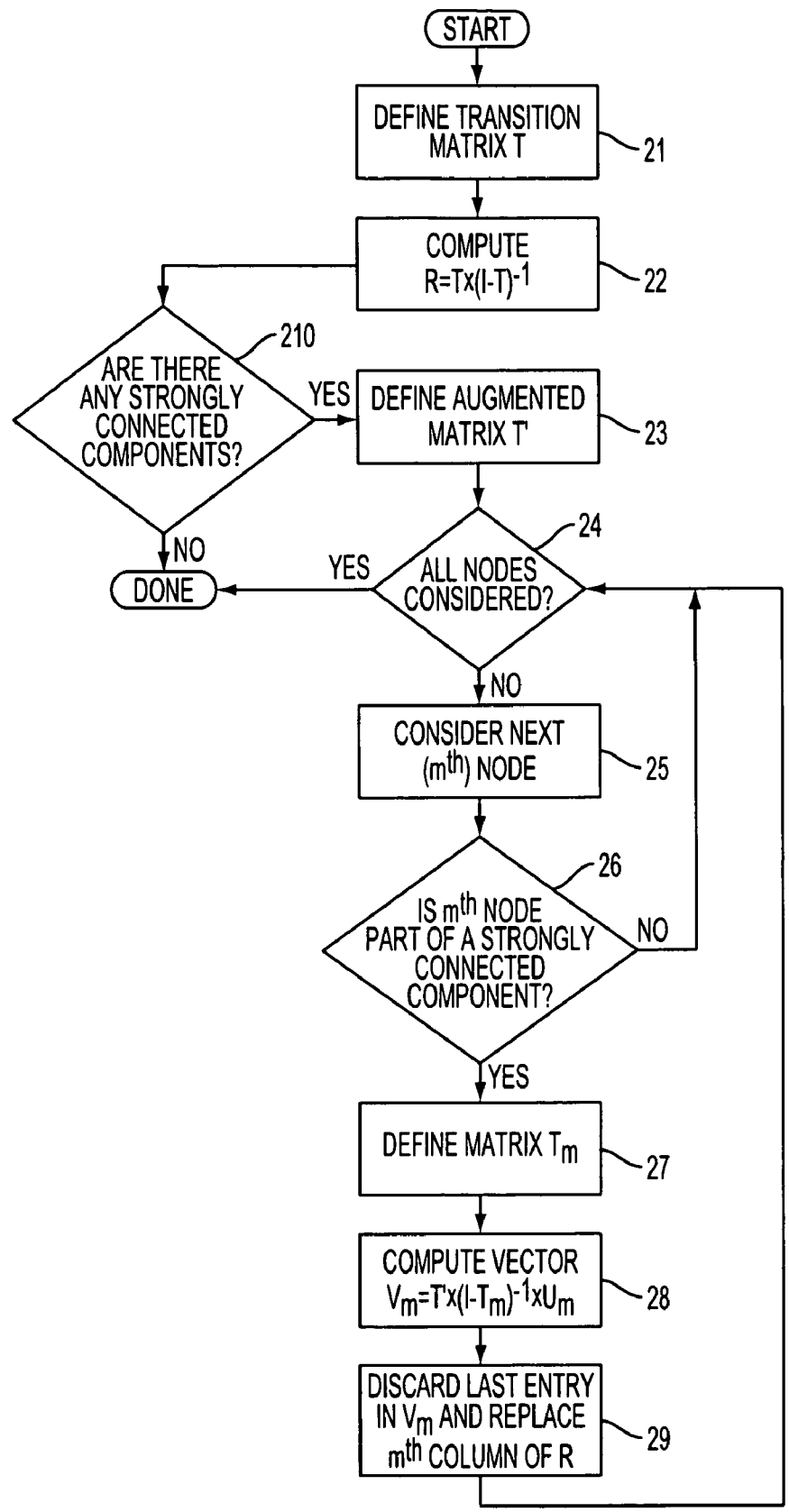
FIG. 2 depicts a flowchart of a method according to an exemplary embodiment of the invention.

One may then use the operation described in conjunction with block 28 of FIG. 2 to obtain:

$$V_A = \begin{bmatrix} 0.72 \\ 0.72 \\ 0.9 \\ 0.9 \\ 0 \\ 0.96 \\ 0 \end{bmatrix}.$$

Similarly, one may find that $$V_B = \begin{bmatrix} 1 \\ 0.72 \\ 0.9 \\ 0.9 \\ 0 \\ 0.96 \\ 0 \end{bmatrix}, V_C = \begin{bmatrix} 0.8 \\ 0.8 \\ 0.72 \\ 0.72 \\ 0 \\ 0.88 \\ 0 \end{bmatrix}, \text{ and } V_D = \begin{bmatrix} 0.8 \\ 0.8 \\ 1 \\ 0.72 \\ 0 \\ 0.88 \\ 0 \end{bmatrix}.$$

One may then remove the last entry from each vector (a zero in each case) and substitute for a corresponding column of R. This gives the following result matrix:

$$\begin{bmatrix} 0.72 & 1 & 0.8 & 0.8 & 1 & 0 \\ 0.72 & 0.72 & 0.8 & 0.8 & 1 & 0 \\ 0.9 & 0.9 & 0.72 & 1 & 1 & 0 \\ 0.9 & 0.9 & 0.72 & 0.72 & 1 & 0 \\ 0 & 0 & 0 & 0 & 0 & 0 \\ 0.96 & 0.96 & 0.88 & 0.88 & 1 & 0 \end{bmatrix}.$$

In view of this result, one may, in addition to the obvious choices of A->B, C->D, and any of (A, B, C, D, F)->E, all of which have reaching probabilities of 1, choose to consider F->A and F->B as the next best choices for speculative parallel threading, as they have associated transition probabilities of 0.96.

Figure 4A:
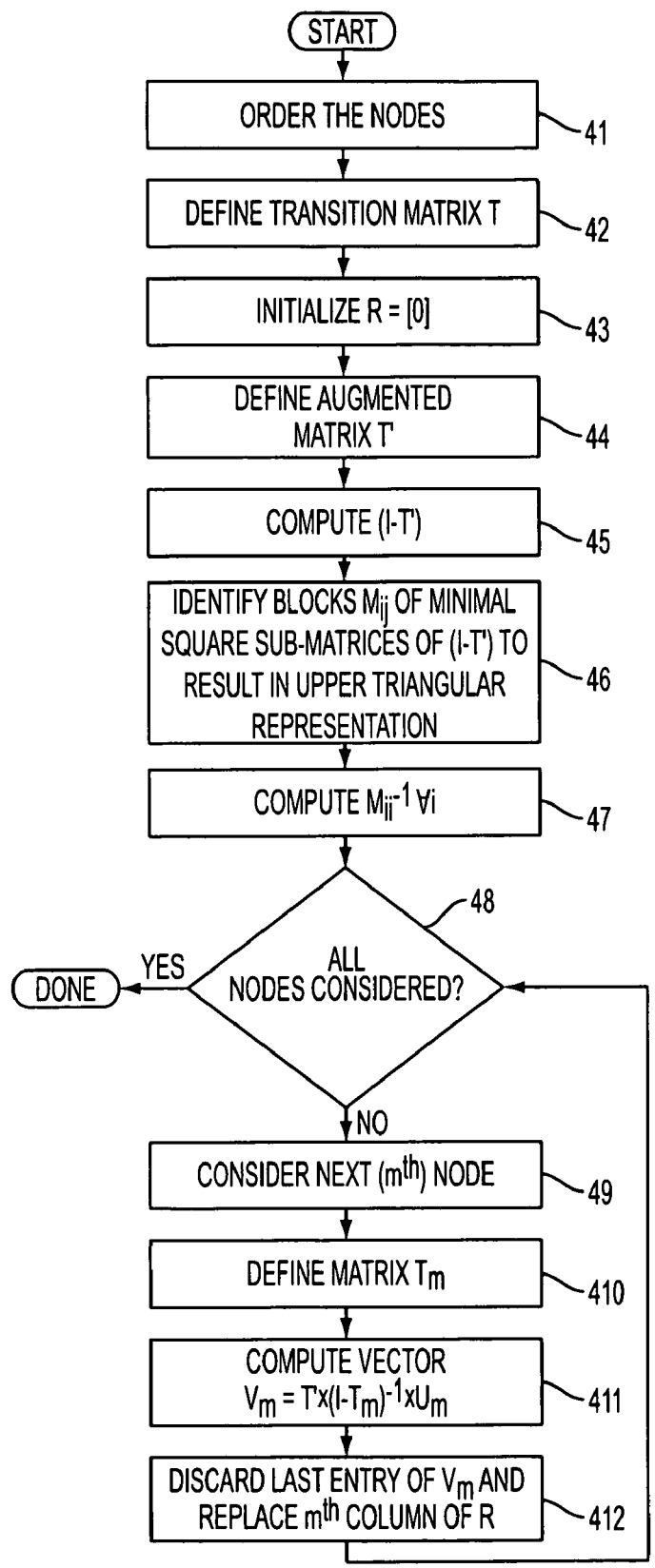
FIGS. 4A and 4B depict a flowchart of a method according to an exemplary embodiment of the invention.
Figure 4B:
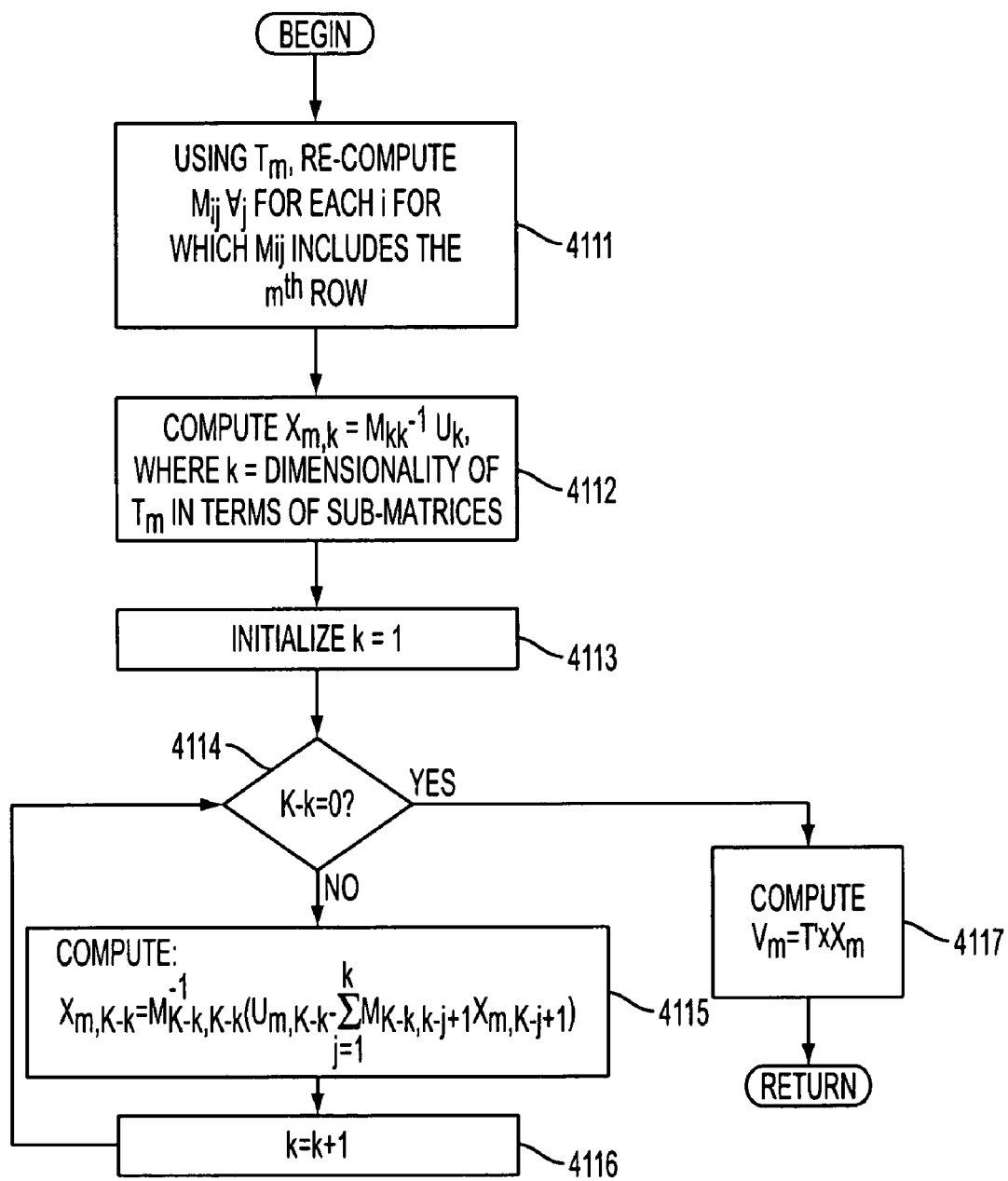

Upon inspection of the above-described process, one may notice that a large number of matrix inversion operations may be necessary. Noting that CFGs generally may have small in- and out-degrees, T may be a sparse matrix, so it may be possible to utilize any known, or as yet to be discovered, fast matrix inversion algorithm applicable to such matrices to speed up the process. FIGS. 4A and 4B give a flowchart depicting the incorporation of such an algorithm in an exemplary embodiment of a process according to the invention; it should be noted, however, that the invention is not intended to be limited to the embodiment of FIGS. 4A and 4B.

In FIG. 4A, as opposed to in FIG. 2, the process may begin by ordering the nodes of the CFG, in block 41. In particular, the process may begin by identifying all strongly connected components of the CFG and by replacing each strongly connected component with a placeholder node. The nodes of the resulting reduced CFG, including the placeholder nodes, may then be topologically sorted. The nodes of each strongly connected component may then be substituted, in arbitrary order, in the place of the corresponding placeholder node. Noting the discussion above in connection with the embodiment of FIG. 2, should there be no strongly connected component in the CFG, it may not be necessary to use the process of FIGS. 4A and 4B at all, but rather, one may obtain the desired results by computing $R=T\times(I-T)^{-1}$.

Similarly to FIG. 2, the process of FIG. 4A may continue with block 42, in which the transition matrix T may be formed for the sorted nodes (that is, the entries of T may be determined by the order in which the nodes have been sorted).

Unlike FIG. 2, however, the process may then continue by initializing a result matrix R to have all zero entries, in block 43.

Following block 43, the process may continue to block 44, where the augmented matrix T' may be defined as previously. That is, an additional row and column of zeros may be added following the last row and column of T, to thus represent an "exit state." Then, in block 45, using an identity matrix I the same dimensionality as T', the matrix (I−T') may be computed.

In order to implement an accelerated method of performing matrix inversions that may be needed in subsequent portions of the process, the process may continue with block 46. In block 46, the matrix (I−T') may be examined to identify minimal square sub-matrices $M_{ii}$ that may result in an upper triangular representation for (I−T). That is, the result of block 46 may be a representation of (I−T') in the form, $$(I-T') = \begin{bmatrix} M_{11} & M_{12} & \cdots & M_{1K} \\ 0 & M_{22} & \cdots & M_{2K} \\ \vdots & \ddots & \ddots & \vdots \\ 0 & 0 & 0 & M_{KK} \end{bmatrix},$$

where K represents the dimensionality of (I−T') in terms of the sub-matrices $M_{ij}$. In this representation, only the sub-matrices $M_{ii}$ on the diagonal need be square matrices; in general, the other sub-matrices may not be square. The inverses of the sub-matrices $M_{ii}$ on the diagonal may then be found, as noted in block 47.

In blocks 48, 49, 410, 411, and 412, each node may be considered in a similar fashion as in blocks 24-29 of FIG. 2. In particular, the process may continue from block 47 to block 48, where the process may determine if all of the nodes have been considered, in which case the process may be complete, or if there may still be nodes left to consider. In the latter case, the process may continue to block 49, where the next node, not previously considered, may be chosen; this node will be denoted as the mth node. The process may then proceed to block 410, in which the matrix $T_m$ may be formed in the same manner as described in connection with block 27 of FIG. 2. The process may then continue with block 411, where the vector $V_m$ may be computed as $V_m = T' \times (I-T_m)^{-1} \times U_m$. The process may further proceed to block 412, where vector $V_m$, with its last entry deleted, may be substituted for the mth column of result matrix R. The process may then loop back to block 48, where it may be determined if there are further nodes to consider.

A difference between the process of FIG. 2 and the process of FIG. 4A may lie in the use of the sub-matrices described above in computing each vector $V_m$, in block 411. FIG. 4B shows a flowchart of an embodiment of block 411 that may use the sub-matrices.

In block 4111 of FIG. 4B, based on $T_m$, the process may re-form $M_{ij}$ for all j, and for i for which the mth row lies within the ith sub-matrix row (recalling that when (I−T') is expressed in terms of the sub-matrices, its dimensionality, in terms of the number of sub-matrices, may be less than its dimensionality, expressed in terms of the number of entries; this holds true for (I−$T_m$), as well). These re-formed sub-matrices may now form an upper triangular representation of (I−$T_m$), along with the unchanged previously determined sub-matrices (of (I−T')).

To implement an exemplary method for efficiently computing the vector $V_m$, one may consider that the expression, $V_m = T' \times (I-T_m)^{-1} \times U_m$, may be expressed as $V_m = T' \times X_m$, where $X_m = (I-T_m)^{-1} \times U_m$. This latter equation may be solved recursively for the entries of the vector $X_m$. In particular, given an upper triangular representation for (I−$T_m$), the equation for $X_m$ may be expressed in the form, $$\begin{bmatrix} M_{11} & M_{12} & \cdots & M_{1K} \\ 0 & M_{22} & \cdots & M_{2K} \\ \vdots & \ddots & \ddots & \vdots \\ 0 & 0 & 0 & M_{KK} \end{bmatrix} \times \begin{bmatrix} X_{m1} \\ X_{m2} \\ \vdots \\ X_{mK} \end{bmatrix} = \begin{bmatrix} U_{m1} \\ U_{m2} \\ \vdots \\ U_{mK} \end{bmatrix},$$

where $X_{mj}$ and $U_{mj}$ are column vectors of the same dimensionality as the sub-matrices $M_{ii}$, which form the column vectors $X_m$ and $U_m$, respectively, into arrays of K vectors having the same dimensionality as the sub-matrices and corresponding to associated entries of the sub-matrices. The above matrix equation may suggest a recursive solution, $$X_{mK} = M_{KK}^{-1} U_K$$

$$X_{m,K-1} = M_{K-1,K-1}^{-1} (U_{m,K-1} - M_{K-1,K} X_{m,K}).$$

$$\vdots$$

It may be noted that this recursive solution uses the inverses of the diagonal sub-matrices of the upper triangular representation of $T_m$, which, except for the sub-matrix $M_{ii}$ that contains the mth row, may have been pre-computed earlier (e.g., in FIG. 4A, block 47). These equations may be implemented by blocks 4112-4116 of FIG. 4B.

In particular, after block 4111, the process may proceed to block 4112, where the first equation of the recursive solution above may be solved. The process may then proceed to block 4113, where an index k is initialized to one. The process may then proceed to block 4114, where it is determined if K−k=0, which may indicate that all of the equations in the recursive solution have been solved. If yes, then the solution may be combined to form the vector $X_m$, and this may, in turn, be used to solve for $V_m$ in block 4117. Otherwise, the process may proceed to block 4115.

In block 4115, the next recursion equation may be solved. In particular, as suggested above, the recursion equations, for $1 \leq k < K$, may be expressed as $$X_{m,K-k} = M_{K-k,K-k}^{-1} \left( U_{m,K-k} - \sum_{j=1}^{k} M_{K-k,K-j+1} X_{m,K-j+1} \right).$$

After block 4115, the process may proceed to block 4116, where k may be incremented, and from which the process may loop back to block 4114.

Figure 5:
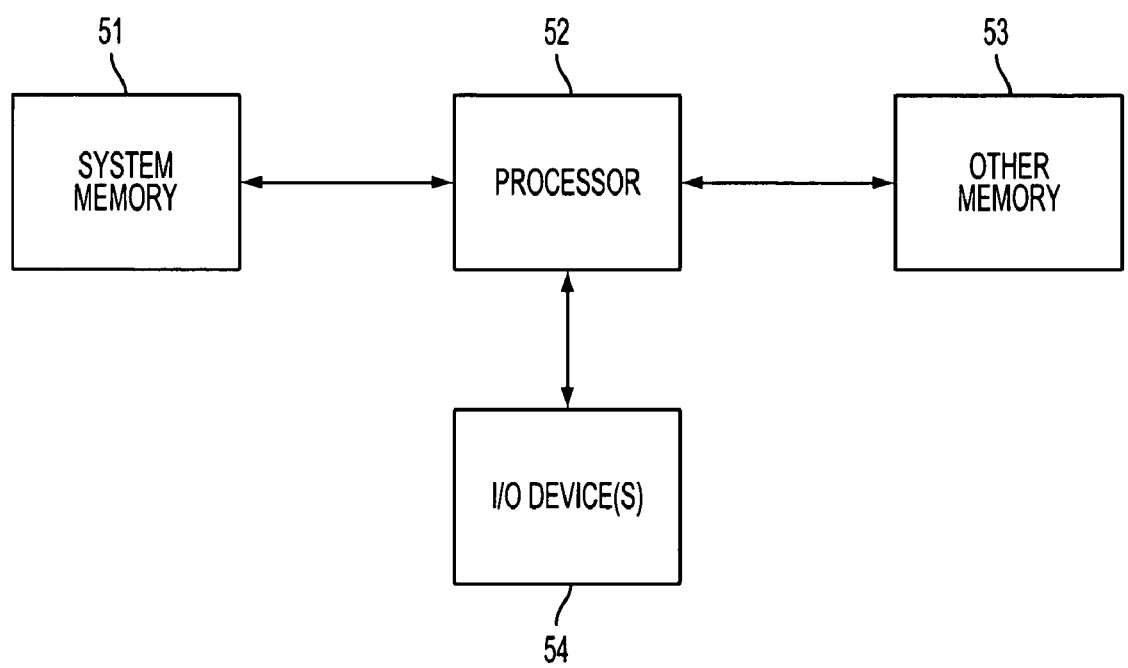
FIG. 5 depicts a conceptual block diagram of a computer system that may be used to implement an embodiment of the invention.

Some embodiments of the invention, as discussed above, may be embodied in the form of software instructions on a machine-accessible medium. Such an embodiment is illustrated in FIG. 5. The computer system of FIG. 5 may include at least one processor 52, with associated system memory 51, which may store, for example, operating system software and the like. The system may further include additional memory 53, which may, for example, include software instructions to perform various applications. System memory 51 and additional memory 53 may be implemented as separate memory devices, they may be integrated into a single memory device, or they may be implemented as some combination of separate and integrated memory devices. The system may also include one or more input/output (I/O) devices 54, for example (but not limited to), keyboard, mouse, trackball, printer, display, network connection, etc. The present invention may be embodied as software instructions that may be stored in system memory 51 or in additional memory 53. Such software instructions may also be stored in removable media (for example (but not limited to), compact disks, floppy disks, etc.), which may be read through an I/O device 54 (for example, but not limited to, a floppy disk drive). Furthermore, the software instructions may also be transmitted to the computer system via an I/O device 54, for example, a network connection; in this case, the signal containing the software instructions may be considered to be a machine-accessible medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method for speculative computing, comprising:
    modeling a software system in the form of a control flow graph, the control flow graph comprising nodes and directed edges, each node corresponding to a component of the software system, and each edge corresponding to a single-step transition of the software system from one component to another component;
    assigning a transition probability to each edge of the control flow graph;
    modeling the control flow graph as a Markov chain having a transition matrix T comprising the transition probabilities;
    computing reaching probabilities of reaching each node of the control flow graph from any other node of the control flow graph using the Markov chain comprising:
        defining a reaching probabilities matrix R;
        if the control flow graph contains any strongly connected components:
            defining an augmented matrix T' based on T and containing an additional row and column;
            re-computing at least one of a row and a column of R, corresponding to a node in the strongly connected components using T';
            repeating the re-computation of at least one of a row and a column of R for each node in the strongly connected components; and
            updating the reaching probabilities matrix, R using the re-computed columns or rows of R; and
    performing at least one of speculative parallel thread compilation for the software system or speculative parallel thread execution for the software system based on the computed or re-computed reaching probabilities.

2. The method according to claim 1, wherein each said single-step transition is modeled as being independent of each other single-step transition.

3. The method according to claim 1, wherein re-computing at least one of a row and a column of R using T' comprises:
    defining a modified version $T_m$, of T', corresponding to a particular node m that is part of the strongly connected components of the control flow graph; and
    applying a matrix inversion algorithm based on strongly connected properties of T and T'.

4. The method according to claim 3, wherein reaching probabilities matrix R is initially set to $R=T \times (I-T)^{-1}$, where I is an identity matrix of dimensionality identical to that of T; wherein, for a particular node m that forms a node of a strongly connected component of the control flow graph, said defining a modified version of $T_m$ of T' comprises defining $T_m$ by setting a row of T' corresponding to node m so that all entries are zero except for a last entry, which is set equal to one; and wherein re-computing at least one of a row and a column of R using T' further comprises:
    computing $V_m = T' \times (I-T_m)^{-1} \times U_m$, where $U_m$ is a unit column vector having a one in an mth position and I is an identity matrix having dimensionality identical to that of $T_m$;
    removing a last entry of $V_m$ to create a vector $V_m'$; and
    substituting $V_m'$ for an mth column of R.

5. The method according to claim 3, wherein said modeling the control flow graph as a Markov chain comprises topologically sorting said nodes prior to forming transition matrix T; wherein reaching probabilities matrix R is initially set to be an all-zeros matrix of dimensionality identical to T; wherein said defining a modified version $T_m$ of T' for a particular node m of a strongly connected component of the control flow graph, comprises defining $T_m$ by setting a row of T' corresponding to node m so that all entries are zero except for a last entry, which is set equal to one; and wherein said re-computing at least one of a row and a column of R using T' further comprises:
    computing $(I-T_m)$, where I is an identity matrix of dimensionality equal to that of T'; and
    for each node m of the control flow graph:
        computing $V_m = T' \times (I-T_m)^{-1} \times U_m$, where $U_m$ is a unit column vector having a one in an mth position and I is an identity matrix having dimensionality identical to that of $T_m$;
        removing a last entry of $V_m$ to create a vector $V_m'$; and
        substituting $V_m'$ for an mth column of R.

6. The method according to claim 5, wherein said computing $$V_m = T' \times (I-T_m)^{-1} \times U_m \text{ comprises:}$$

identifying blocks $M_{ij}$ of minimal square sub-matrices of (I-T') that result in an upper triangular representation of (I-T');
determining $M_{ij}^{-1}$ for all i;
re-determining $M_{ij}$ using corresponding entries of $T_m$ for all j, for each i for which $M_{ij}$ includes an mth row of $T_m$;
computing $X_{m,K} = M_{K,K}^{-1} U_{m,K}$, where $U_{m,K}$ is a column vector having zeros in all positions except for a position, if present, corresponding to node m, and where $X_{m,K}$ and $U_{m,K}$ are column vectors of dimensionality identical to that of $M_{K,K}$, and where K represents a dimensionality of $T_m$ in terms of sub-matrices;

recursively computing $X_{m,K-k}$ for all k from one up to K-1 according to $$X_{m,K-k} = M_{<-k,K-k}^{-1} \times \left( U_{m,K-k} - \sum_{j=1}^{k} M_{K-k,K-j+1} X_{m,K-j+1} \right);$$

and computing $V_m = T' \times X_m$, where $X_m$ is a column vector of the form $$X_m = \begin{pmatrix} X_{m,1} \\ \vdots \\ X_{m,K} \end{pmatrix}.$$

7. A machine-readable storage medium containing software code that, when executed by a computer, causes the computer to perform a method for speculative computing, comprising:

computing reaching probabilities of reaching each node of the control flow graph from any other node of the control flow graph using a Markov chain model of a software system, the Markov chain model corresponding to a control flow graph of the software system, the control flow graph comprising nodes and directed edges, each directed edge having an associated transition probability, the transition probabilities forming a transition matrix T, wherein computing reaching probabilities of reaching each node of the control flow graph from any other node of the control flow graph using a Markov chain model comprises:

defining a reaching probabilities matrix R;

if the control flow graph contains any strongly connected components:

defining an augmented matrix T' based on T and containing an additional row and column;

re-computing at least one of a row and a column of R, corresponding to a node in the strongly connected components using T';

repeating the re-computation of at least one of a row and a column of R for each node in the strongly connected components; and updating the reaching probabilities matrix, R using the re-computed columns or rows of R; and performing at least one of speculative parallel thread compilation for the software system or speculative parallel thread execution for the software system based on the computed or re-computed reaching probabilities.

8. The machine-readable storage medium according to claim 7, wherein re-computing at least one of a row and a column of R using T' comprises:

defining a modified version $T_m$, of T', corresponding to a particular node m that is part of the strongly connected components of the control flow graph; and applying a matrix inversion algorithm based on strongly connected properties of T and T'.

9. The machine-readable storage medium according to claim 8, wherein reaching probabilities matrix R is initially set to $R = T \times (I-T)^{-1}$, where I is an identity matrix of dimensionality identical to that of T; wherein, for a particular node m that forms a node of a strongly connected component of the control flow graph, said defining a modified version of $T_m$ of T' comprises defining $T_m$ by setting a row of T' corresponding to node m so that all entries are zero except for a last entry, which is set equal to one; and wherein said re-computing at least one of a row and a column of R using T' further comprises:

computing $V_m = T' \times (I-T_m)^{-1} \times U_m$, where $U_m$ is a unit column vector having a one in an mth position and I is an identity matrix having dimensionality identical to that of $T_m$;

removing a last entry of $V_m$ to create a vector $V_m'$; and substituting $V_m'$ for an mth column of R.

10. The machine-readable storage medium according to claim 8, wherein said modeling the control flow graph as a Markov chain comprises topologically sorting said nodes prior to forming transition matrix T; wherein reaching probabilities matrix R is initially set to be an all-zeros matrix of dimensionality identical to T; wherein said defining a modified version $T_m$ of T' for a particular node m of a strongly connected component of the control flow graph, comprises defining $T_m$ by setting a row of T' corresponding to node m so that all entries are zero except for a last entry, which is set equal to one; and wherein said re-computing at least one of a row and a column of R using T' further comprises:

computing $(I-T_m)$, where I is an identity matrix of dimensionality equal to that of T'; and for each node m of the control flow graph:

computing $V_m = T' \times (I-T_m)^{-1} \times U_m$, where $U_m$ is a unit column vector having a one in an mth position and I is an identity matrix having dimensionality identical to that of $T_m$;

removing a last entry of $V_m$ to create a vector $V_m'$; and substituting $V_m'$ for an mth column of R.

11. The machine-readable storage medium according to claim 10, wherein said computing $V_m = T' \times (I-T_m)^{-1} \times U_m$ comprises:

identifying blocks $M_{ij}$ of minimal square sub-matrices of (I-T') that result in an upper triangular representation of (I-T');

determining $M_{ij}^{-1}$ for all i;

re-determining $M_{ij}$ using corresponding entries of $T_m$ for all j, for each i for which $M_{ij}$ includes an mth row of $T_m$;

computing $X_{m,K} = M_{K,K}^{-1} U_{m,K}$, where $U_{m,K}$ is a column vector having zeros in all positions except for a position, if present, corresponding to node m, and where $X_{m,K}$ and $U_{m,K}$ are column vectors of dimensionality identical to that of $M_{K,K}$, and where K represents a dimensionality of $T_m$ in terms of sub-matrices;

recursively computing $X_{m,K-k}$ for all k from one up to K-1 according to $$X_{m,K-k} = M_{K-k,K-k}^{-1} \times \left( U_{m,K-k} - \sum_{j=1}^{k} M_{K-k,K-j+1} X_{m,K-j+1} \right);$$

and computing $V_m = T' \times X_m$, where $X_m$ is a column vector of the form $$X_m = \begin{pmatrix} X_{m,1} \\ \vdots \\ X_{m,K} \end{pmatrix}.$$

12. A computer system for speculative computing comprising:
   at least one processor and a memory to store a program of instructions which when executed by the processor cause the computer system to perform a method for speculative computing comprising:
   computing reaching probabilities of reaching each node of the control flow graph from any other node of the control flow graph using a Markov chain model of a software system, the Markov chain model corresponding to a control flow graph of the software system, the control flow graph comprising nodes and directed edges, each directed edge having an associated transition probability, the transition probabilities forming a transition matrix T, wherein computing reaching probabilities of reaching each node of the control flow graph from any other node of the control flow graph using a Markov chain model comprises:
   defining a reaching probabilities matrix R;
   if the control flow graph contains any strongly connected components:
   defining an augmented matrix T' based on T and containing an additional row and column;
   re-computing at least one of a row and a column of R, corresponding to a node in the strongly connected components using T';
   repeating the re-computation of at least one of a row and a column of R for each node in the strongly connected components; and
   updating the reaching probabilities matrix, R using the re-computed columns or rows of R; and
   performing at least one of speculative parallel thread compilation for the software system or speculative parallel thread execution for the software system based on the computed or re-computed reaching probabilities.

13. The computer system according to claim 12, further comprising:
   a machine-readable storage medium containing software code that, when executed by said at least one processor, causes the computer system to perform said method for speculative computing.

* * * * *